US009917432B2

(12) United States Patent  
Serdynski et al.

(10) Patent No.: US 9,917,432 B2  
(45) Date of Patent: Mar. 13, 2018

(54) SYSTEM FOR ISOLATING POWER CONDUCTORS USING MOLDED ASSEMBLIES

(71) Applicant: Rockwell Automation Technologies, Inc., Mayfield, OH (US)

(72) Inventors: David P. Serdynski, Waukesha, WI (US); Dean T. Meyer, Oak Creek, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/970,884

(22) Filed: Dec. 16, 2015

(65) Prior Publication Data

US 2017/0098929 A1    Apr. 6, 2017

Related U.S. Application Data

(60) Provisional application No. 62/236,382, filed on Oct. 2, 2015.

(51) Int. Cl.
| | |
|---|---|
| *H02G 5/00* | (2006.01) |
| *H02G 5/02* | (2006.01) |
| *H02B 1/14* | (2006.01) |
| *H02B 1/21* | (2006.01) |

(52) U.S. Cl.  
CPC .............. *H02G 5/025* (2013.01); *H02B 1/14* (2013.01); *H02B 1/21* (2013.01)

(58) Field of Classification Search  
CPC ...... H01R 25/14; H01H 31/003; H01H 31/18; H02B 1/14; H02B 1/21; H02B 1/056; H02G 5/02; H02G 5/025

USPC .......... 174/70 B; 218/154; 361/636; 439/212  
See application file for complete search history.

(56) References Cited

U.S. PATENT DOCUMENTS

| | | | | | |
|---|---|---|---|---|---|
| 3,588,620 | A | * | 6/1971 | Waileski | H02B 1/056 174/72 B |
| 4,752,233 | A | * | 6/1988 | Morby | H02B 1/056 361/636 |
| 5,220,268 | A | * | 6/1993 | Rose | B60L 11/1818 320/107 |
| 2004/0045937 | A1 | * | 3/2004 | Hoglund | H01H 31/18 218/154 |
| 2015/0372460 | A1 | * | 12/2015 | Faber | H01H 9/22 361/611 |
| 2017/0098489 | A1 | * | 4/2017 | Serdynski | H02B 1/21 |

* cited by examiner

*Primary Examiner* — Timothy Thompson  
*Assistant Examiner* — Guillermo Egoavil  
(74) *Attorney, Agent, or Firm* — Boyle Fredrickson, SC

(57) ABSTRACT

An improved electrical system may be provided by electrically isolating horizontal power distribution bus bars of differing phases, disposed along a preconfigured isolated bus support molding, from one another by covering each bus bar with an electrically insulating molded assembly. The electrically insulating molded assembly has contours configured to cover a particular bus bar (with respect to another bus bar or live fastener), arranged within the constraints of the preconfigured isolated bus support molding in the electrical system (such as along the back of the isolated bus support, between the isolated bus support and a wall of the electrical system).

19 Claims, 15 Drawing Sheets

SYSTEM FOR ISOLATING POWER CONDUCTORS USING MOLDED ASSEMBLIES

CROSS-REFERENCE TO RELATED APPLICATIONS

This application claims priority to U.S. Provisional Patent Application No. 62/236,382, entitled "System for Isolating Power Conductors Using Molded Assemblies," filed on Oct. 2, 2015, which is herein incorporated by reference.

FIELD OF THE INVENTION

The present invention relates generally to electrical systems, such as for the distribution of power signals to controlled equipment, and more particularly, to electrical isolation in such systems.

BACKGROUND OF THE INVENTION

Electrical systems with packaged electrical and electronic components are known and are in use. For example, Motor Control Centers (MCC's) are used for power and data distribution in large and industrial operations. In MCC's, a variety of components, such as switchgear, semiconductor power electronic circuits, programmable logic controllers, motor controllers, and so forth, are housed in large electrical enclosures that may be subdivided into sections or columns, which may be further subdivided into compartments. The MCC includes associated bus bars, interconnections and supporting structures for distribution of electrical power to the various compartments.

Typically, the MCC is connected to a main power line that may feed three-phase AC power to horizontal bus bars of the MCC. The horizontal bus bars, in turn, may feed the three-phase power to vertical bus bars disposed in each of the sections or columns of the MCC. The vertical bus bars, in turn, may feed the three-phase power to various units (which typically include electrical components) that are installed in compartments of a section. The units, in turn, may provide power terminals (conductors), such as copper bus bars, for feeding the three-phase power to a system environment, such as motors, as may be required for various applications.

However, in order to meet minimum electrical short-circuit protections, such as in accordance with International Electrotechnical Commission (IEC) and/or Underwriters Laboratories (UL) standards, power conductors should be sufficiently insulated and/or mounted with adequate distance from other conductive parts (including neighboring power conductors). Accomplishing this within the access and/or dimension constraints of the MCC and/or constituent components of the MCC is particularly challenging. A need therefore exists to provide the aforementioned electrical short-circuit protections within such access and/or dimension constraints.

SUMMARY OF THE INVENTION

The present inventors have recognized that an improved electrical system may be provided by electrically isolating horizontal power distribution bus bars of differing phases, disposed along a preconfigured isolated bus support molding, from one another by covering each bus bar with an electrically insulating molded assembly. The electrically insulating molded assembly has contours configured to cover a particular bus bar (with respect to another bus bar or live fastener), arranged within the constraints of the preconfigured isolated bus support molding in the electrical system (such as along the back of the isolated bus support, between the isolated bus support and a wall of the electrical system).

Accordingly, exposed bus bars may be electrically isolated from one another. As a result, an improved electrical system may be provided that is less susceptible to "arc flash" (a phenomena in which a luminous discharge of current is formed when a current jumps a gap, through air or gas, in a circuit or between two conductors) and/or other hazards.

Aspects of the invention may allow for insulation of a back side of an isolated bus support without the need to modify the isolated bus support. This overcomes the significant challenges and lead-times encountered with having to use epoxy to insulate such areas. The invention may be part of a system for insulating buses, such as in compliance with the International Electrotechnical Commission (IEC) 61641:2014 guide for testing under conditions of arcing due to internal fault. Accordingly, a molded insulator may be provided instead of less desirable epoxy, molded boots, shrink tubing and/or tape. The invention may provide a molded insulator with contours which may work with virtually any bus geometry.

A fastener, bus clamp or other power conductor may be "live" if it carries electrical current or charge, such as by going through a current carrying bus for structural mounting and/or current exchange. The electrically insulating molded assembly may also protect against such exposed live fasteners.

Aspects of the invention may eliminate the need to modify the isolated bus support molding; may avoid requiring a re-test of any short circuit as the structural support of the bus may remain unchanged; and may be backwards compatible with systems already deployed in the field. Aspects of the invention may also avoid shrink tubing, which may require rounded edge bus bars and an oven with process controls to shrink uniformly (further requiring long cycle times and energy consumption). Aspects of the invention may also avoid epoxy, which may be costly, have long lead times, consume large amounts of energy in track ovens to coat and cure, and which might not work with multiple bus bars for higher current ratings.

Aspects of the invention may use an injection molded part designed to create a labyrinth of insulation around a horizontal bus bar without the need for tooling modifications of an isolated bus support, or a width of a standard bus bar. The invention may advantageously avoid "doubling up" on bus bar as a full 4" width bus can be used as procured without modifications. Accordingly, assembly time may be reduced from as much as 40 hours per section/column to as little as 2 hours or less. Also, the invention may avoid the need to manually apply heat shrink tubing to bus bars (as bus bars may typically generate significant heat), or the need to manually cut pieces of heat shrink tubing after shrinking, such as to allow conductors to be bolted together at current exchange joints. Accordingly, the invention may remove a dependency on assembly to remove shrink tubing after applying shrink tubing, and before assembly. Moreover, shrink tubing and tape may be eliminated from use in this area altogether when employing aspects of the invention.

The electrically insulating molded assembly may be a single injection molded part, may be manufactured from a thermoplastic or thermosetting polymer, and/or may be black in color to maximize radiant cooling.

Specifically then, one aspect of the present invention provides a system for isolating power conductors including:

a bus support; first and second power conductors disposed proximal to one another along the bus support; and an electrically insulating molded assembly having at least one contour configured to cover at least one of the first and second power conductors. The electrically insulating molded assembly may electrically isolate the first power conductor from the second power conductor.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DETAILED DESCRIPTION

Figure 1:
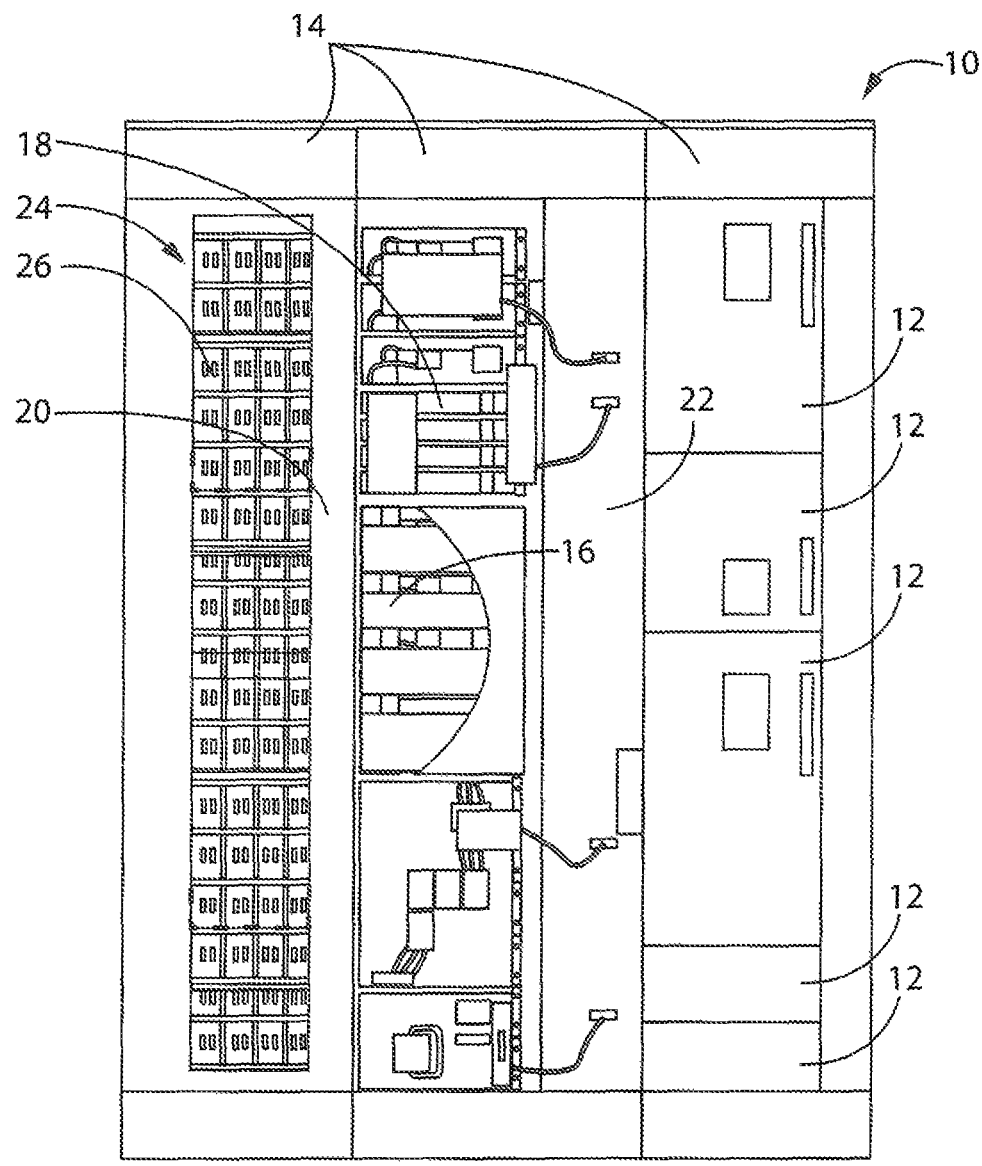
FIG. 1 is an exemplary electrical system in which electrical units of various types may be housed in accordance with an aspect of the invention.

Referring now to FIG. 1, an exemplar electrical system 10 is provided in which electrical units 12 of various types may be housed. The electrical system 10 may be, for example, a Motor Control Center ("MCC") or other industrial, commercial, marine, or other electrical system. In general, the electrical system 10 may provide one or more sections 14, each forming a shell around a device mounting volume for supporting the units 12. The shell may be made of any suitable material, such as heavy gage sheet metal, reinforced plastics, and so forth. The electrical system 10 may typically receive three-phase power from an external power supply, such as a power supply grid, and/or data signals, via appropriate conduits (not shown), and distribute the received power and/or data signals to one or more of the sections 14 in various manners. The sections 14 may be electrically isolated from one another, or alternatively, may be electrically joined with other sections 14, such as via common horizontal power buses 16.

The units 12 may each include a door for covering an assembly of components 18 that are supported within each unit 12 via known methods, such as screwed or snap-in engagement, thereby providing mechanical and electrical connection to the electrical system 10. Exemplary components 18 of the units 12 may include relays, motor starters, and Programmable Logic Controllers ("PLC's"), among others. Doors for the units 12 may include, for example, a lever for opening the door, a lock for preventing the door from opening, and/or light for indicating a safe condition for opening the door. A latch rail (not shown) may be provided in each section 14 to interface with latches on the individual doors of the units 12.

The sections 14 may also include wire-ways 20 in which line and load wiring, cabling and so forth may be installed to service the components 18. The sections 14 may optionally include preconfigured isolation areas 22 for variations in which greater electrical isolation between sections 14 is desired.

Along a rear wall of each of the sections 14 may be disposed a vertical bus system 24 configured to facilitate distribution of power throughout a corresponding section 14, such as in a plug-in manner. The bus system 24 may be generally formed as a backplane having slots 26 for receiving conventional stab-type electrical connections on rear surfaces of device supports received within a section 14. Such slot and stab arrangements are generally known in the art. As illustrated, the slots 26 may be divided into pairs to receive a corresponding two-pronged stab for each phase of electrical power. Rows of such slots 26 may be provided to allow device supports to be mounted at various levels within a section 14.

Figure 2:
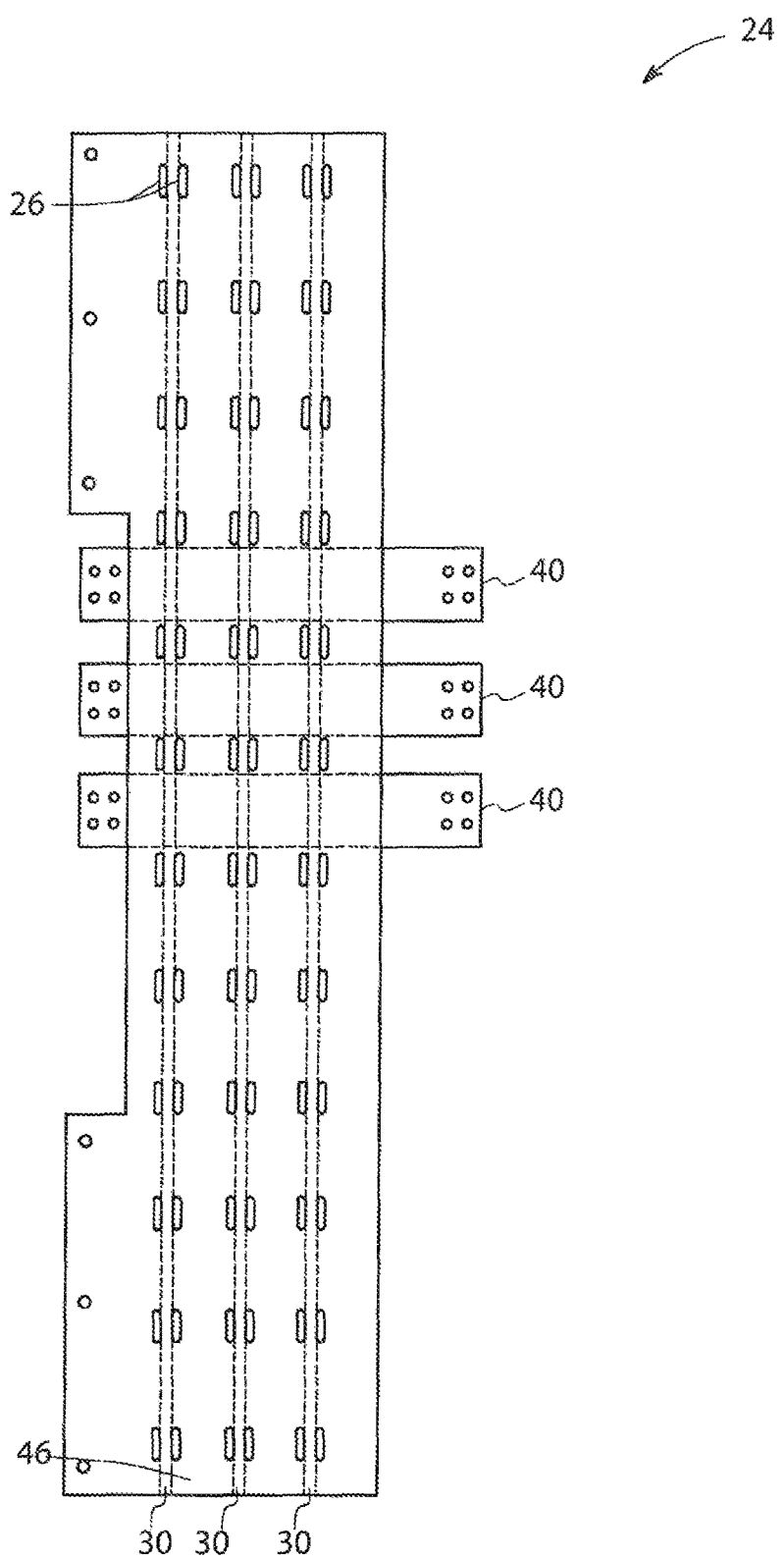
FIG. 2 is an exemplary bus system which may be included within a section of the electrical system of FIG. 1 in accordance with an aspect of the invention.

Referring now to FIG. 2, an exemplary configuration of the bus system 24 of FIG. 1 is provided. The bus system 24 may include multiple power busses disposed within a section 14. In the illustrated embodiment, the bus system 24 includes first, second and third vertical bus conductors 30 disposed proximal to one another, which may correspond to differing phases of a three-phase power system (power conductors). Further, the bus system 24 includes first, second and third horizontal bus conductors 40 disposed proximal to one another, which may also correspond to the differing phases of the three-phase power system (power conductors), but in a different direction.

In certain embodiments, the horizontal bus conductors 40 could be coupled to cabling that supplies three-phase power from an external power supply, such as a power supply grid, and the first, second and third horizontal bus conductors 40 could be coupled to the first, second and third vertical bus conductors 30. Also, in certain embodiments, the horizontal bus conductors 40 of one section could be coupled (or "spliced") with the horizontal bus conductors 40 of another (flanking) section. In alternative embodiments, more horizontal and/or vertical bus conductors could be provided, such as for providing a neutral conductor, a protective earth, ground or additional power phase, or fewer horizontal and/or vertical bus conductors could be provided, as appropriate for the environment.

The bus system 24 may include a bus cover 46 and a rear bus support that will be described in greater detail below. In the illustrated embodiment, the bus cover 46 may include a molded sheet of synthetic material disposed over the vertical and horizontal bus conductors and may serve to prevent contact with underlying power busses except through the slots 26. The vertical bus conductors 30 are typically made of a bar stock or tubing stock with a flat area that permits them to be mechanically and electrically coupled to corresponding horizontal bus conductors 40 in the bus system 24.

Connection of component supports (such as mounted on plates or drawers, not shown) may be made by two pronged stabs that are received through the slots 26 and engage the individual bus bars behind the bus cover 46. As described above, the bus system 24 further includes a bus support configured to support the vertical and horizontal bus conductors that is described in detail below with reference to FIG. 3.

Figure 3:
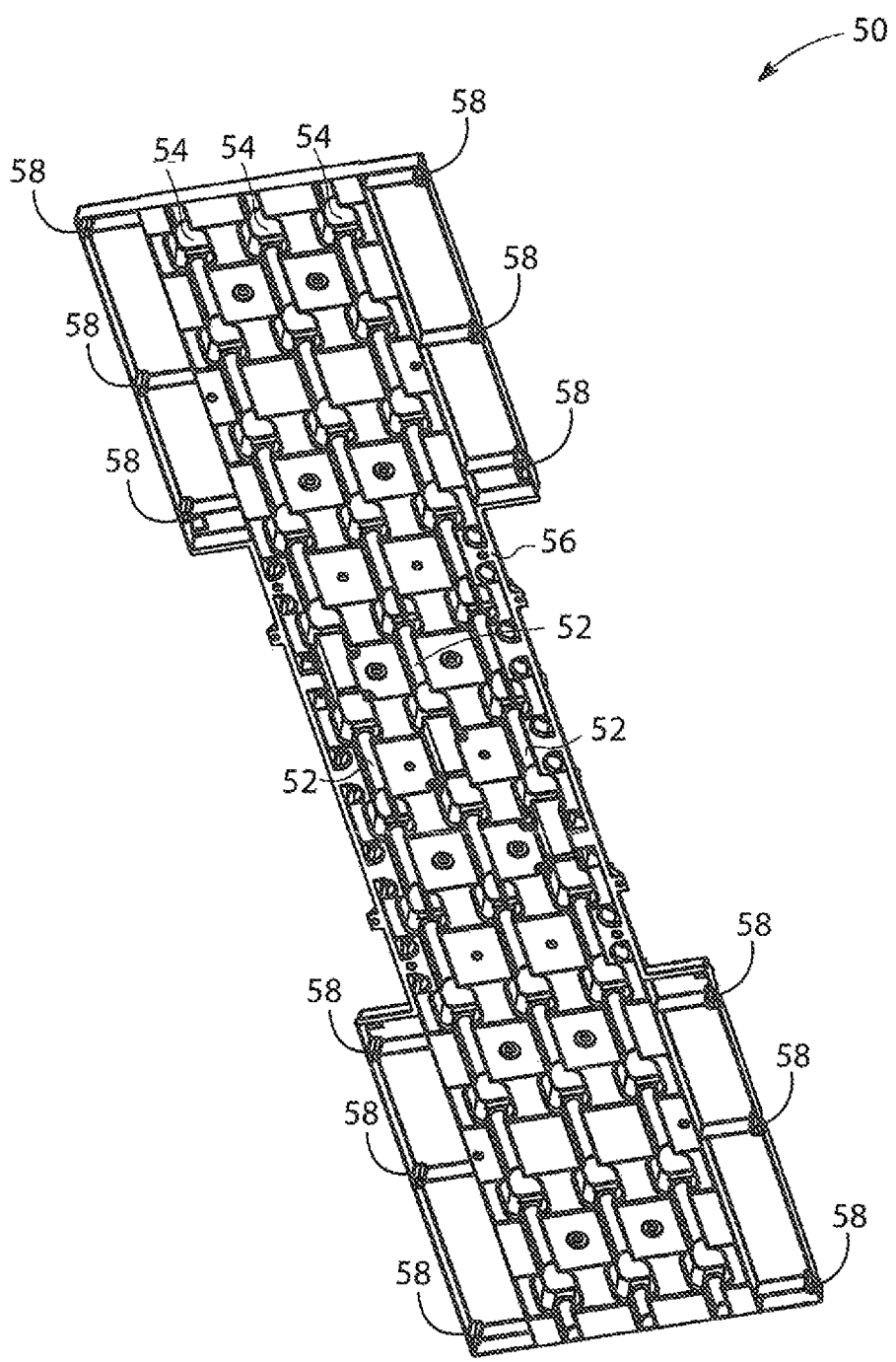
FIG. 3 is an exemplary preconfigured isolated bus support which may support power busses of the bus system of FIG. 2 in accordance with an aspect of the invention.

Referring now to FIG. 3, an exemplary preconfigured isolated bus support 50 is illustrated for supporting the power busses of the bus system 24 of FIG. 2. As illustrated, the bus support 50 may be a molding with vertical channels 52 to receive the vertical bus conductors 30 of FIG. 2. Each of the vertical channels 52 may include rear protrusions 54 on a rear side 56 of the bus support 50. In the illustrated embodiment, the bus support 50 mechanically supports the various horizontal and vertical bus conductors. Within the bus system 24, and generally between the bus support 50 and the bus cover 46 (see FIG. 2), each vertical bus conductor may generally include a connection portion that is engaged by stabs of component supports and a bus anchoring portion.

Accordingly, the horizontal bus conductors 40 (see FIG. 2) may be generally supported on a rear surface of the bus support 50, while the vertical bus conductors 40 (see FIG. 2) may be supported on a front surface thereof. In the illustrated embodiment, the bus support 50 includes a series of apertures 58 or holes for receiving mounting bolts or screws. These apertures 58 will generally be aligned with corresponding apertures in rear of the electrical system 10 to support the bus system 24 when mounted therein. The vertical bus conductors 30 may be received within corresponding recesses of the vertical channels 52. The recesses may generally be semicircular grooves in which the vertical bus conductors 30 may lie.

Opposing the rear protrusions 54, which may be somewhat deeper than the recesses, are pockets designed to receive and accommodate stabs (not shown) of component supports that will protrude through the slots 26 in the bus cover 46. Furthermore, the bus support 50 may include a series of apertures (not shown) that extend completely through the bus support 50 for mechanical and electrical connection to the horizontal bus conductors 40.

In the illustrated embodiment, the bus support 50 may be formed as a single piece of molded plastic material. The material is preferably one that will not degrade or melt with elevated temperatures that may occur during normal operation. In certain embodiments, the bus support 50 may comprise glass filled polyester, a thermoset plastic. The bus support 50 could also include add-on bus support braces (not shown) disposed on the rear side of the bus support which may be configured to contact the channels to limit movement of the vertical bus conductors during a high current event.

Figure 4:
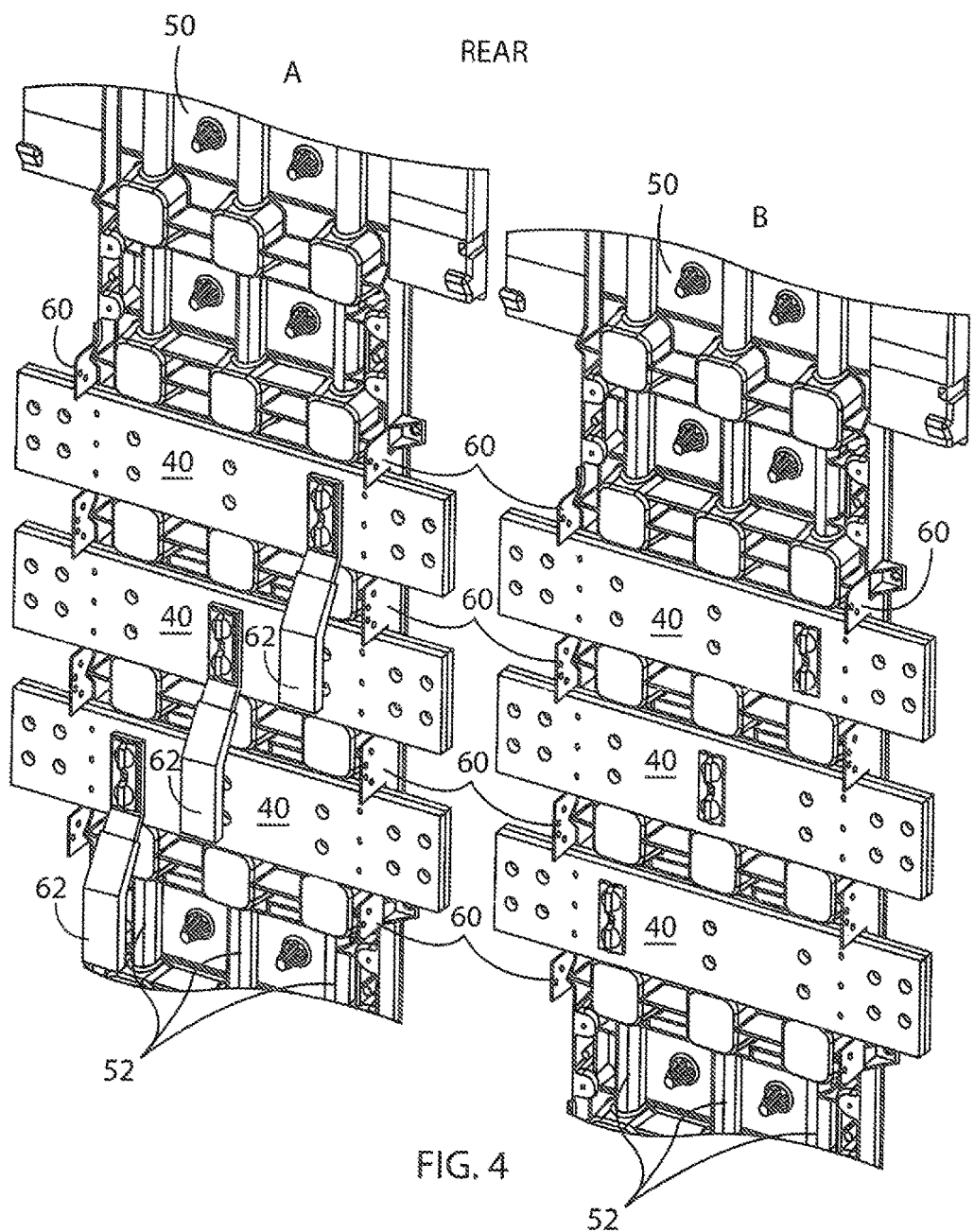
FIG. 4 is a rear view of flanking bus supports, each with horizontal bus conductors disposed thereon, in accordance with an aspect of the invention.
Figure 17:
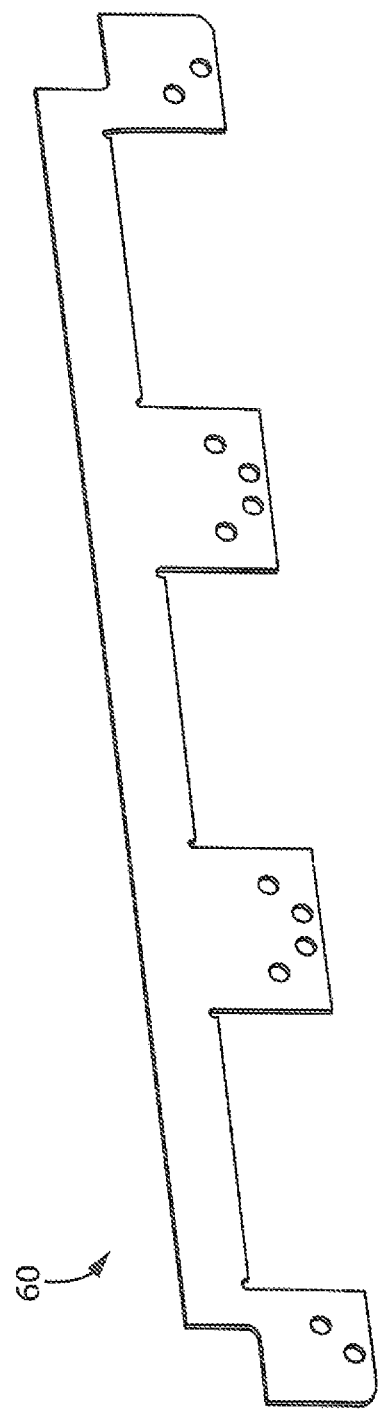
FIG. 17 is a vertical insulating barrier in accordance with an aspect of the invention.

Referring now to FIG. 4, a rear view of flanking bus supports 50 (identified as bus supports "A" and "B"), each with horizontal bus conductors 40 disposed thereon, is provided. Bus supports A and B may be provided, for example, in flanking sections 14 in the electrical system 10. In the configuration as shown, the horizontal bus conductors 40 of bus support A are disconnected and electrically separate from the horizontal bus conductors 40 of bus support B. A vertical insulating barrier 60 (see also FIG. 17) may be provided on each of the edges of the bus supports A and B, the vertical insulating barrier 60 being contoured around the horizontal bus conductors 40 to provide electrical isolation and protection in gaps between the horizontal bus conductors 40. In addition, a flexi-bar 62 or insulated cables may be fastened to each horizontal bus conductor 40 to provide a respective electrical power phase to the horizontal bus conductor 40 from the external power supply received by the electrical system 10.

Figure 5:
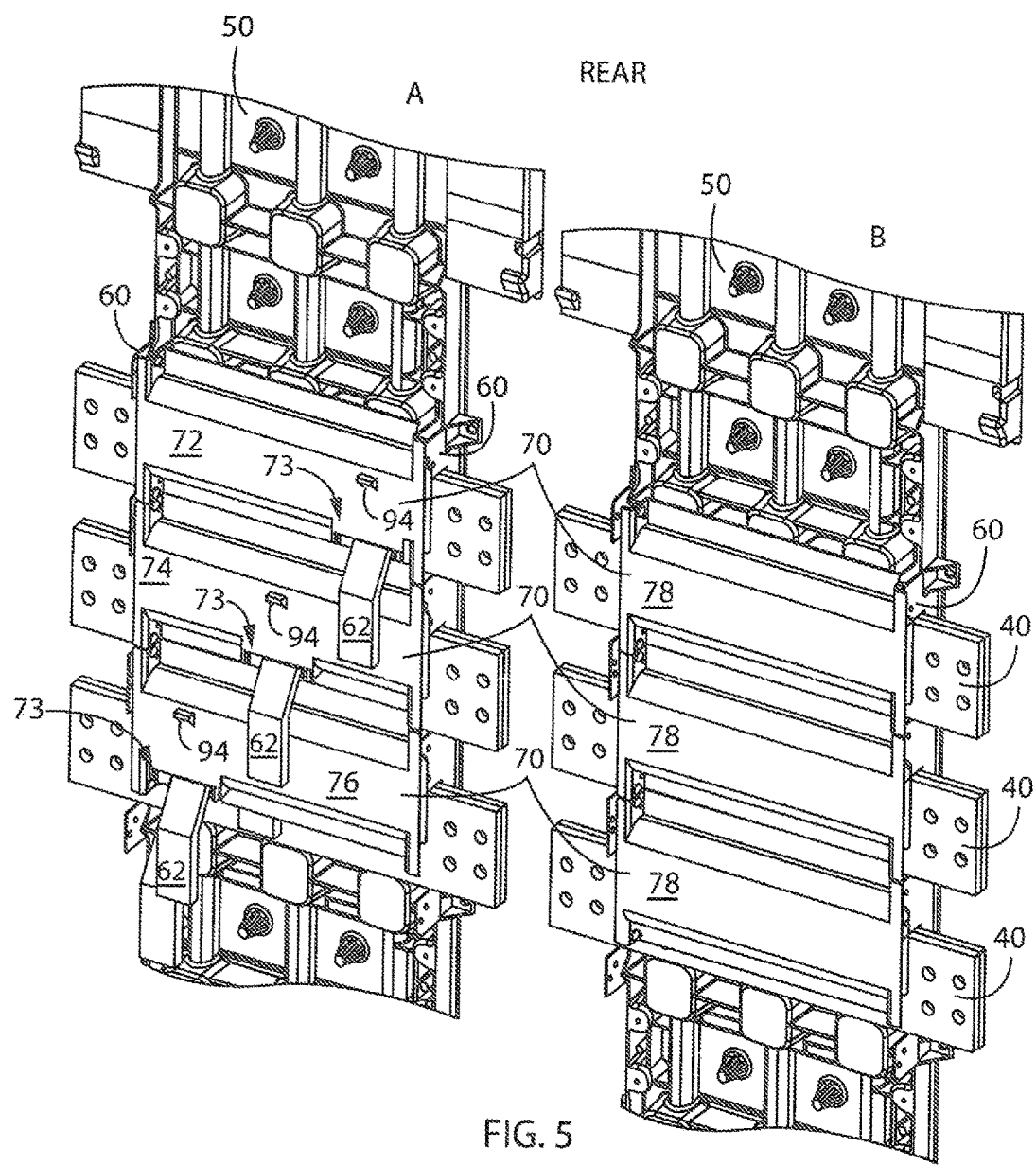
FIG. 5 is the rear view of FIG. 4 in which the horizontal bus conductors are each covered by electrically insulating molded assemblies in accordance with an aspect of the invention.

Referring now to FIG. 5, a rear view of the flanking bus supports A and B of FIG. 4 is provided in which the horizontal bus conductors 40 are each covered by electrically insulating molded assemblies 70. The molded assemblies 70 have contours configured to cover the particular horizontal bus conductors 40 (with respect to other horizontal bus conductors 40 or other live fastener), within the constraints of the bus support 50 molding and positioning with respect to the electrical system 10. In particular, the molded assemblies 70 have contours, for example, configured to cover the first horizontal bus conductor 40 with respect to the second horizontal bus conductor 40; the second horizontal bus conductor 40 with respect to the first and third horizontal bus conductors 40; and the third horizontal bus conductor 40 with respect to the second horizontal bus conductor 40, while fitting along the back of the bus support 50, between the bus support 50 and a rear wall of the electrical system 10. The molded assemblies 70 are manufactured from an electrically insulating material, such as a thermoplastic or thermosetting polymer, and may be single injection molded parts. The molded assemblies 70 may also be black in color to maximize radiant cooling.

Figure 12A:
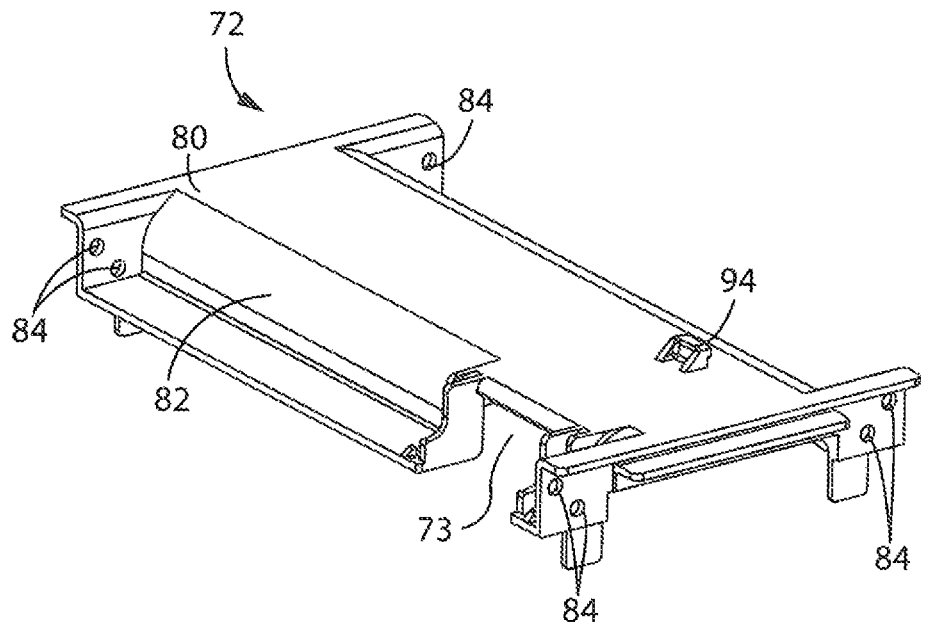
FIG. 12A is an isometric upper view of an electrically insulating molded assembly.
Figure 12B:
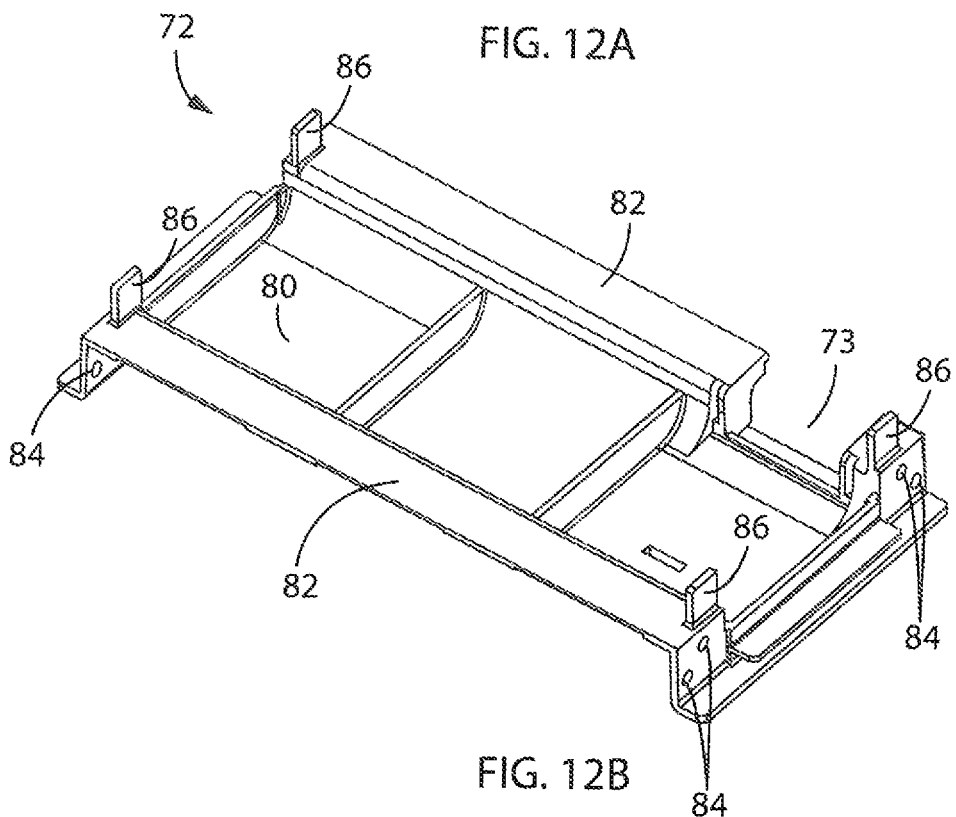
FIG. 12B is an isometric lower view of the electrically insulating molded assembly of FIG. 12A, in accordance with an aspect of the invention.
Figure 13A:
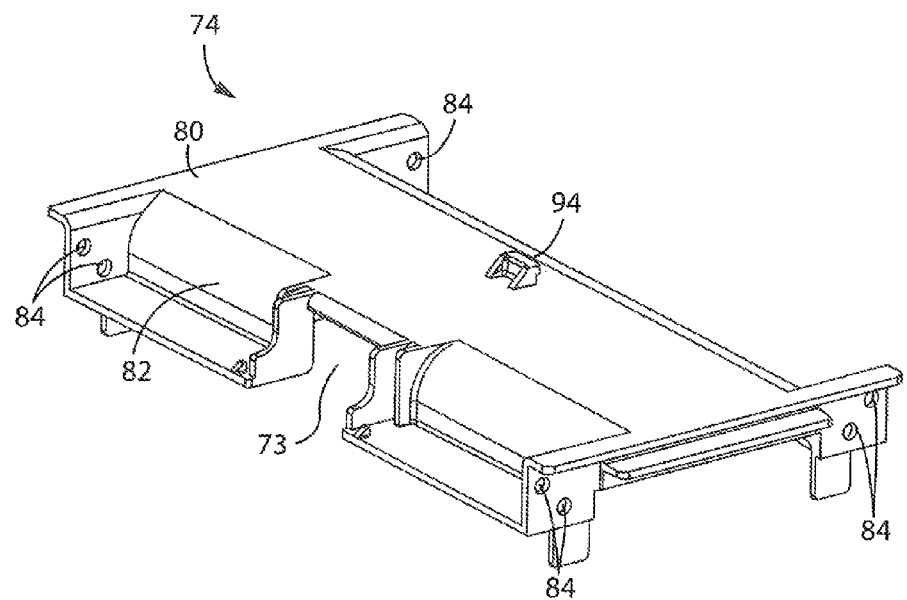
FIG. 13A is an isometric upper view of an alternative electrically insulating molded assembly.
Figure 13B:
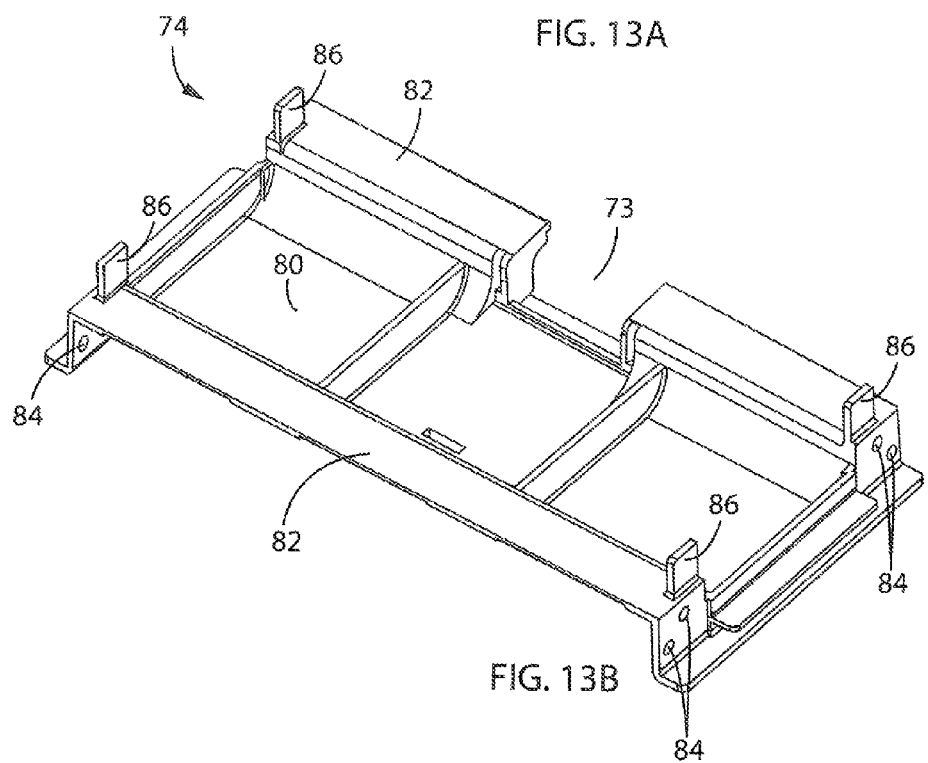
FIG. 13B is an isometric lower view of the electrically insulating molded assembly of FIG. 13A, in accordance with an aspect of the invention.
Figure 14A:
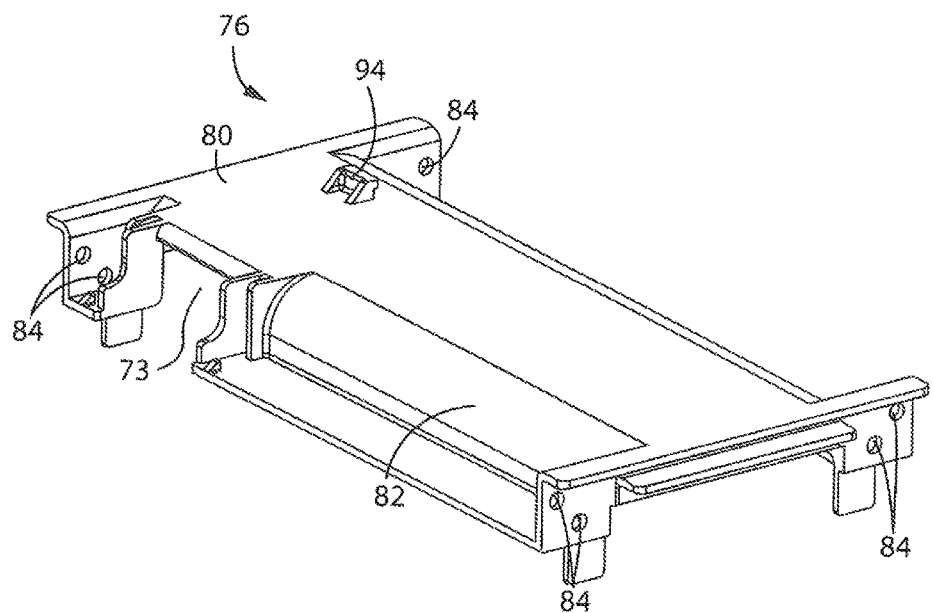
FIG. 14A is an isometric upper view of an alternative electrically insulating molded assembly.
Figure 14B:
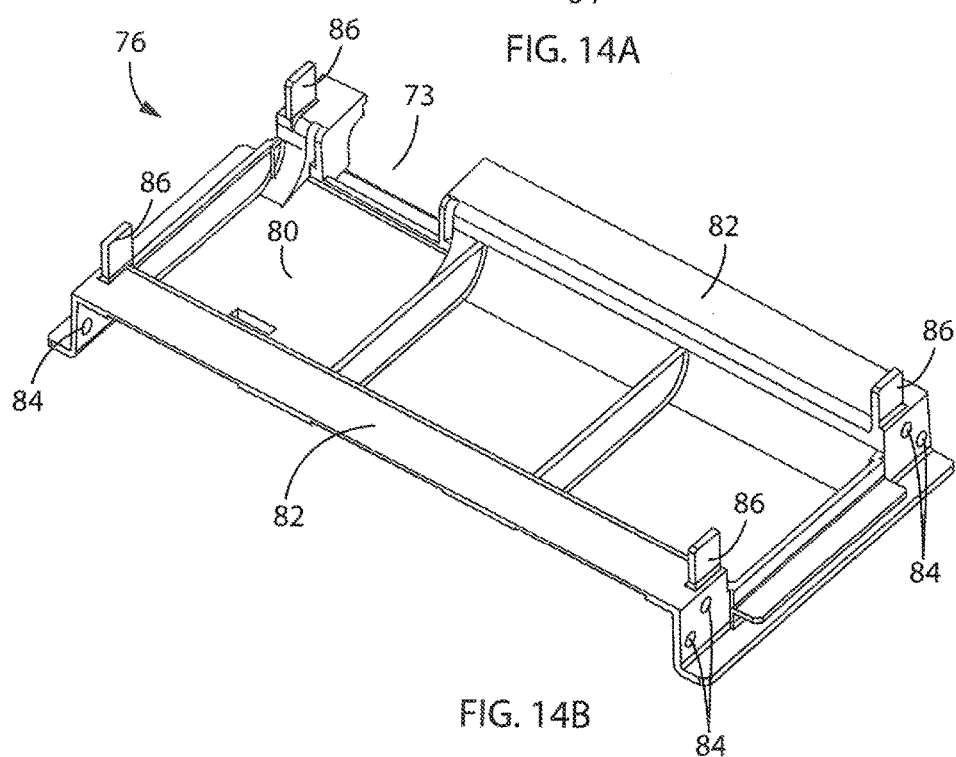
FIG. 14B is an isometric lower view of the electrically insulating molded assembly of FIG. 14A, in accordance with an aspect of the invention.
Figure 15A:
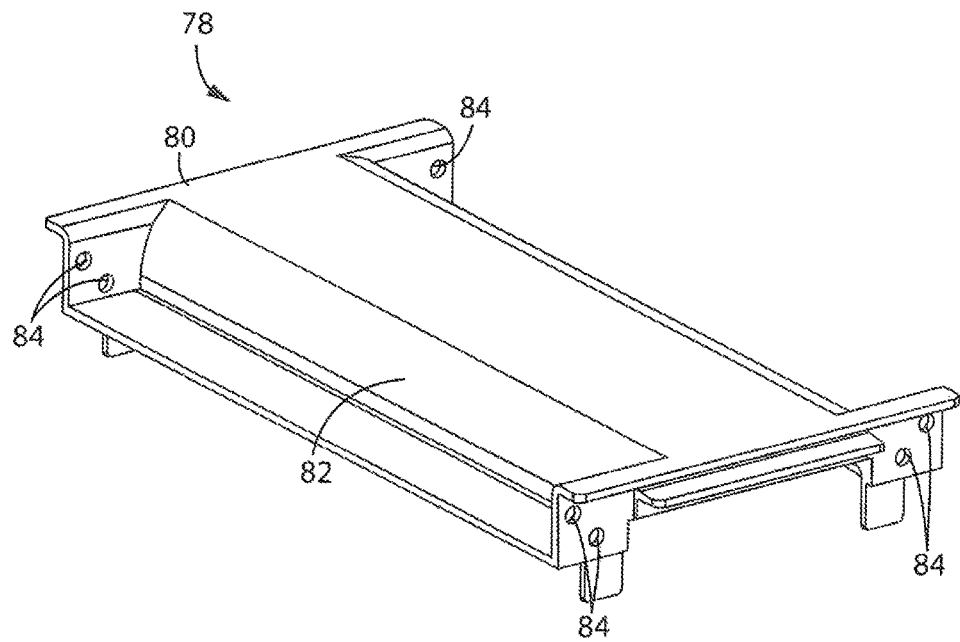
FIG. 15A is an isometric upper view of an alternative electrically insulating molded assembly.
Figure 15B:
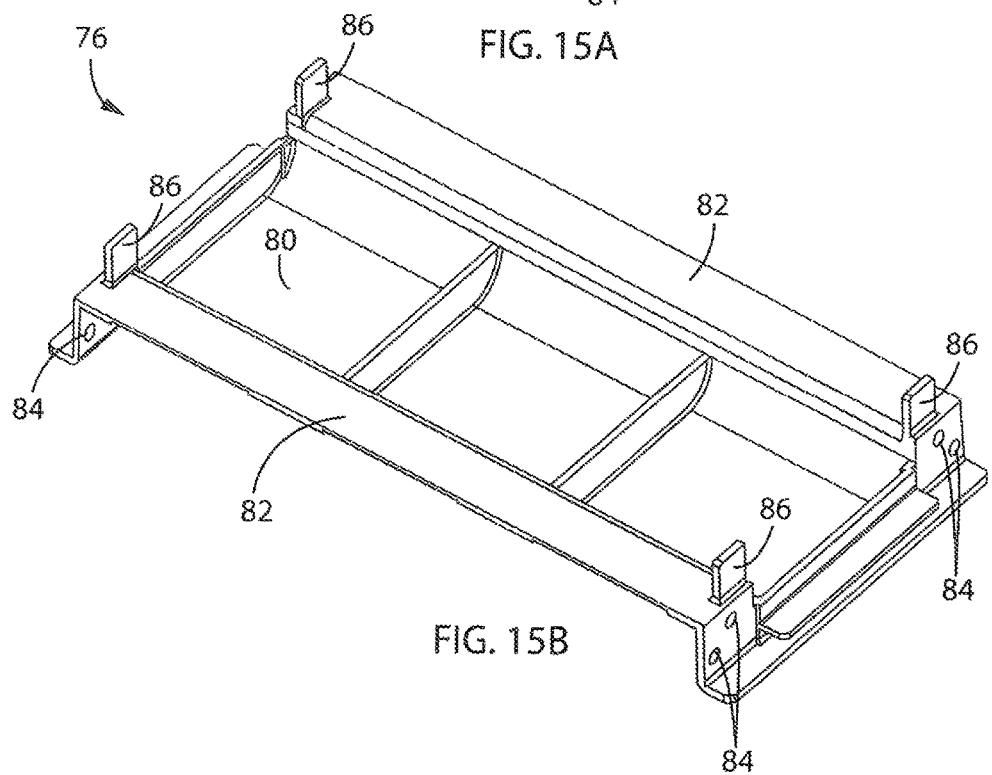
FIG. 15B is an isometric lower view of the electrically insulating molded assembly of FIG. 15A, in accordance with an aspect of the invention.

In a first variation, a molded assembly 72 may provide an opening 73 in a right-most rear side of the molded assembly in order to allow passage for a flexi-bar 62 to provide a first power-phase to the first horizontal bus conductor 40 (see also FIGS. 12A and 12B). In a second variation, a molded assembly 74 may provide an opening 73 in a center of the molded assembly in order to allow passage for a flexi-bar 62 to provide a second power-phase to the second horizontal bus conductor 40 (see also FIGS. 13A and 13B). In a third variation, a molded assembly 76 may provide an opening 73 in a left-most rear side of the molded assembly in order to allow passage for a flexi-bar 62 to provide a third power-phase to the third horizontal bus conductor 40 (see also FIGS. 14A and 14B). In a fourth variation, a molded assembly 78 may be completely covered on the rear side, providing no openings (see also FIGS. 15A and 15B). It will be appreciated that various openings of the molded assembly 70 may be provided in order to allow passage of conductors in various manners as may be desired, within the scope of the invention.

The molded assembly 72 may be contoured to cover the horizontal bus conductor 40, such as by having a substantially flat area 80 disposed directly over the horizontal bus conductor 40, followed by angled or curved areas 82 disposed over upper and lower edges of the horizontal bus conductor 40 to lead flush with the bus support 50. The curved areas 82 of adjacent molded assemblies 70 may eventually come into contact with one another to provide complete electrically insulating coverage over the bus support 50.

As shown in more detail in FIGS. 12-15, the molded assembly 72 may also include apertures 84 or holes for receiving clips (such as canoe clips), plastic rivets, screws or other fasteners 86 for mounting in the electrical system 10, such as mounting to the vertical insulating barrier 60, the bus support 50, or other areas. The molded assembly 72 may also include fins 86 or similar mechanisms for aligning the molded assembly 72, such as with respect to opposing sides the bus support 50, and/or for further retaining the molded assembly 72 in the electrical system 10.

Figure 6:
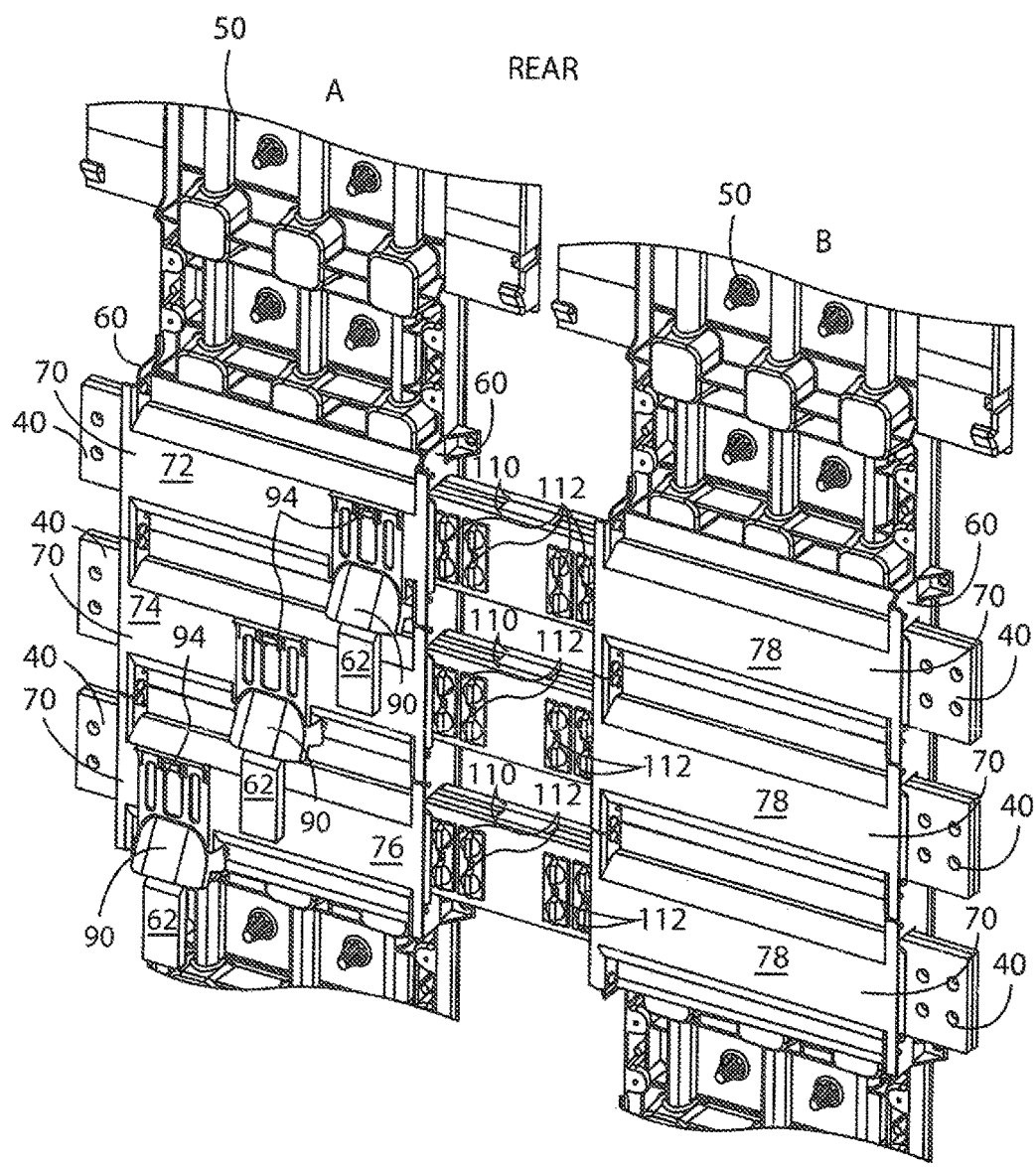
FIG. 6 is the rear view of FIG. 5 in which molded boots are provided and splice areas between sections are also provided in accordance with an aspect of the invention.
Figure 9:
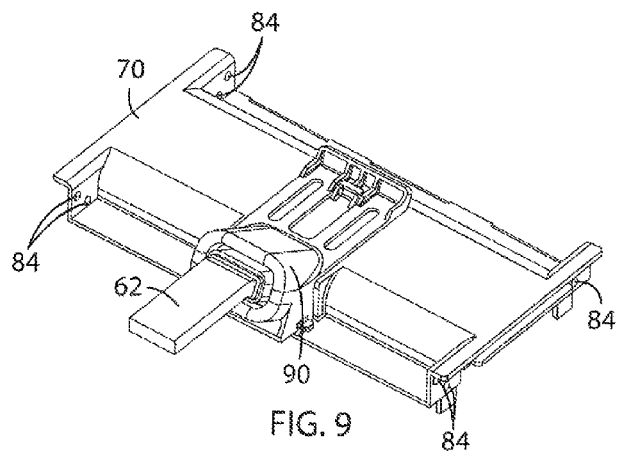
FIG. 9 is an isometric upper view of an electrically insulating molded assembly.
Figure 10:
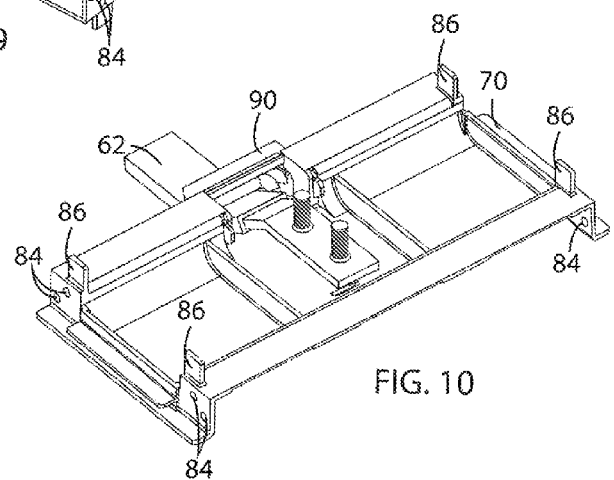
FIG. 10 is an isometric lower view of the electrically insulating molded assembly of FIG. 9, in accordance with an aspect of the invention.
Figure 16A:
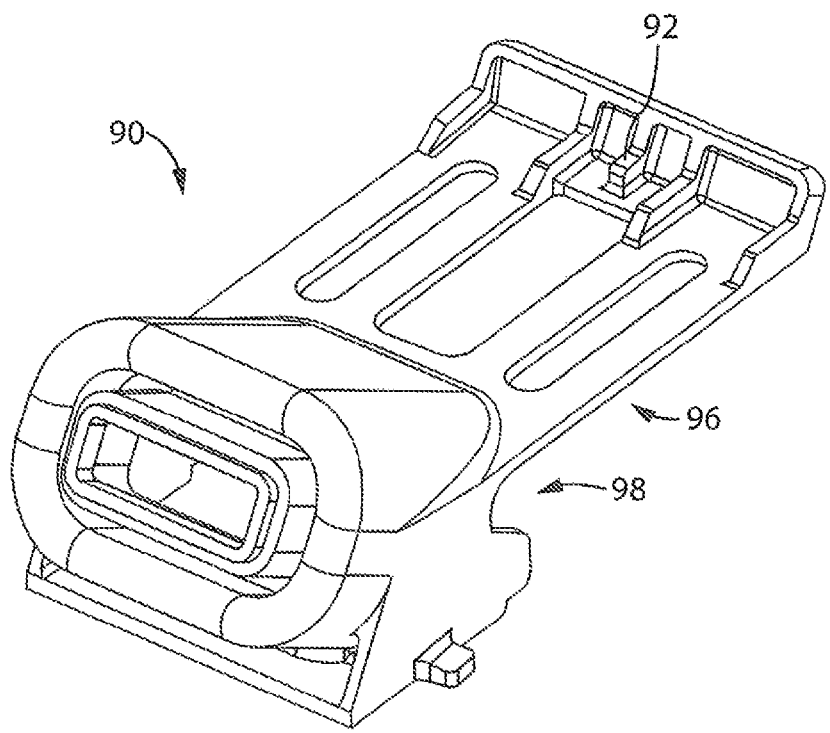
FIG. 16A is an isometric upper view of a molded boot.
Figure 16B:
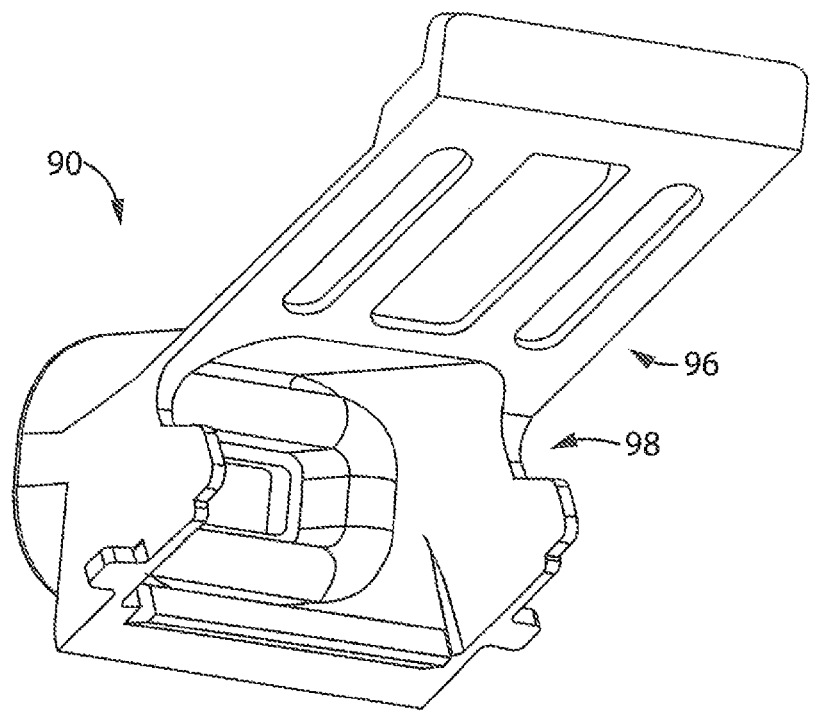
FIG. 16B is an isometric lower view of the molded boot of FIG. 16A, in accordance with an aspect of the invention.

Referring now to FIG. 6, in order to provide even greater electrical isolation between power conductors, a molded boot 90 (see also FIGS. 16A and 16B) may be provided over each molded assembly 76 with respect to the flexi-bar 62. The molded boot 90 may attach to the molded assembly 76 in various ways, such as via a hook 92 on the molded boot 90 interlocking with a retention mechanism 94 on the molded assembly 76 (see also FIGS. 9-11). The molded boot 90 may be contoured to fit around the flexi-bar 62 to provide electrical isolation and protection, including with respect to gaps between the flexi-bar 62 and the molded assembly 72 exposed via the opening 73.

Figure 11:
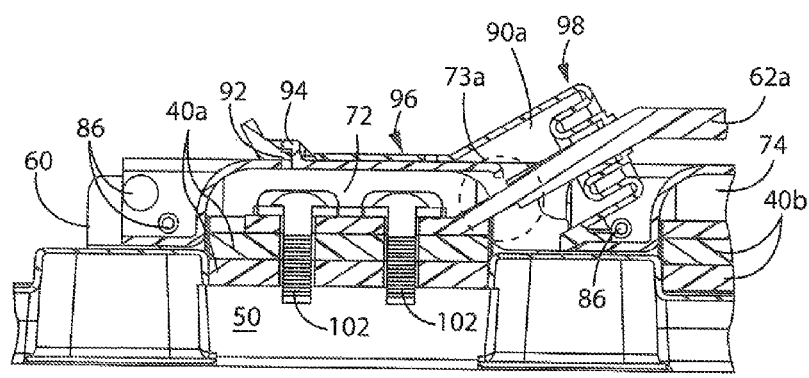
FIG. 11 is a cross sectional view of an electrically insulating molded assembly and folded boot in accordance with an aspect of the invention.

Referring also to FIG. 11, in a first molded boot area 96, the molded boot 90 may contour to fit precisely with the molded assembly 76 along a first plane (with the molded assembly 76). However, in a second molded boot area 98, the molded boot 90 may contour to fit precisely with the flexi-bar 62 along a second plane (with the flexi-bar 62) disposed at an angle with respect to the first plane. In an alternate aspect, a stepped molded boot area (or series of areas) may be provided to contour with a stepped face of a flexi-bar, insulated cable, or other conductor, to thereby pass through the molded boot. The molded boot may be a single part which can be cut to correspond to the size of the conductor being used in different applications without the need for multiple parts. The molded boot 90 is manufactured from an electrically insulating material, such as a thermoplastic or thermosetting polymer, and may be a single injection molded part. Integral to the molded boot may be a bellows to accommodate a wide range of attachment angles of flexi-bar or other conductors providing assembly flexibility. The molded boot 90 may also be black in color to maximize radiant cooling.

Figure 7:
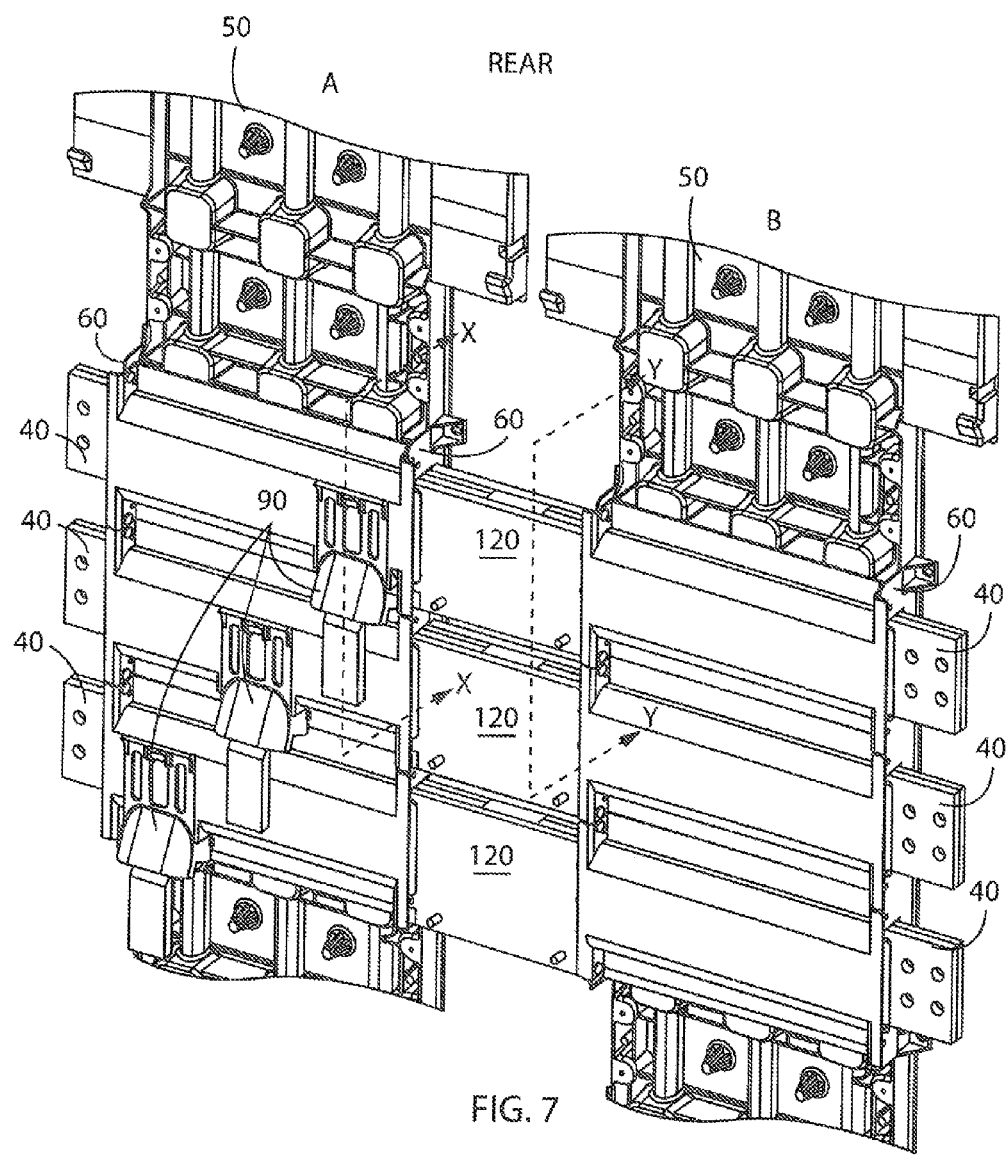
FIG. 7 is the rear view of FIG. 6 in which electrically insulating folded boots are wrapped around the splice plates in accordance with an aspect of the invention.

As may be readily apparent in FIG. 11, a cross sectional view taken along the plane X-X of FIG. 7, the molded assembly 72 covers horizontal bus conductor 40a, which may carry a first power phase. The molded assembly 72 also covers an end portion of flexi-bar 62a (providing the first power phase to the horizontal bus conductor 40a), in addition to flexi-bar screws 102 (live fasteners) which retaining the flexi-bar 62a to the horizontal bus conductor 40a. The opening 73a in the molded assembly 72 allows passage for the flexi-bar 62a to the horizontal bus conductor 40a, and the molded boot 90a provides electrical isolation with respect to gaps between the flexi-bar 62a and the molded assembly 72 exposed via the opening 73a. Next, the molded assembly 74 covers horizontal bus conductor 40b, which may carry a second power phase, and so forth. Accordingly, a labyrinth of insulation is created around the horizontal bus conductors 40, without the need for tooling modifications of the bus support 50.

Referring back to FIG. 6, the horizontal bus conductors 40 of bus support A may be electrically connected to (or "spliced" with) the horizontal bus conductors 40 of bus support B. This may be accomplished by attaching an electrically conducting splice plate 110 between the horizontal bus conductors 40 of bus support A and the horizontal bus conductors 40 of bus support B. The splice plate 110 may be attached to the horizontal bus conductors 40 using bus clamps 112 with opposing nuts and washers. A single splice plate 110 may be used to connect neighboring horizontal bus conductors 40 with lower current ratings, such as 600-1200 Amps. Alternatively, multiple splice plates 110 (such as front and back) may be used to connect neighboring horizontal bus conductors 40 with higher current ratings, such as 1600-3000 Amps.

Figure 8:
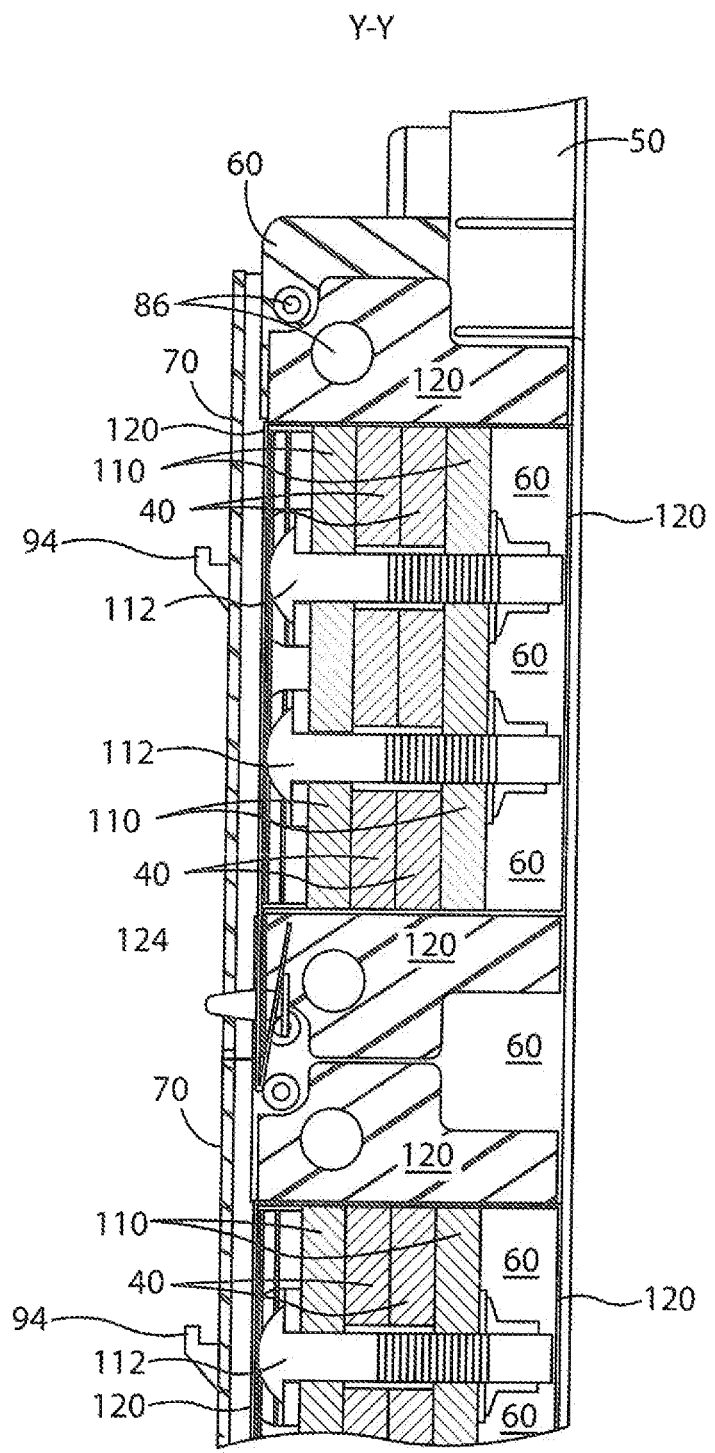
FIG. 8 is a cross sectional view of FIG. 7 taken along the plane Y-Y.

Referring briefly to FIG. 7, when horizontal bus conductors 40 of flanking sections 14 are spliced together, electrically insulating folded boots 120 may wrap around the splice plates 110 to provide continued electrical isolation with respect to the horizontal bus conductors 40. As may be readily apparent in FIG. 8, a cross sectional view taken along the plane Y-Y of FIG. 7, the molded assemblies 72 may connect to the folded boots 120, via the apertures 84 and fasteners 86 of the molded assemblies 70, for securely holding the molded assemblies 70 and, in turn, the folded boots 120, in place.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention: The embodiments described herein explain the best modes known for practicing the invention and will enable others skilled in the art to utilize the invention. All of the publications described herein including patents and non-patent publications are hereby incorporated herein by reference in their entireties.

The present invention may be part of a "safety system" used to protect human life and limb in a field, construction or other environment. Nevertheless, the term "safety," "safely" or "safe" as used herein is not a representation that the present invention will make the environment safe or that other systems will produce unsafe operation. Safety in such systems depends on a wide variety of factors outside of the scope of the present invention including: design of the safety system, installation and maintenance of the components of the safety system, and the cooperation and training of individuals using the safety system. Although the present invention is intended to be highly reliable, all physical systems are susceptible to failure and provision must be made for such failure.

What is claimed is:

1. A system for isolating power conductors comprising:
a bus support;
first and second power conductors disposed proximal to one another along the bus support, wherein the bus support directly supports the first and second power conductors; and
an electrically insulating molded assembly having at least one contour configured to cover at least one of the first and second power conductors,
wherein the at least one of the first and second power conductors that is covered by the electrically insulating molded assembly is electrically insulated by the bus support on one side and by the electrically insulating molded assembly on an opposing side,
wherein the electrically insulating molded assembly includes an opening in the at least one contour configured to allow passage to the at least one of the first and second power conductors, and
wherein the opening is located in at least one of a left side and a right side of the electrically insulating molded assembly.

2. The system of claim 1, wherein the contour provides a substantially flat area disposed directly over the at least one of the first and second power conductors.

3. The system of claim 2, wherein the contour is followed by a curved area disposed over an edge of the at least one of the first and second power conductors.

4. The system of claim 1, further comprising an electrically insulating molded boot attached to the electrically insulating molded assembly over the opening.

5. The system of claim 1, wherein the electrically insulating molded assembly is a single injection molded part.

6. The system of claim 1, wherein the electrically insulating molded assembly is a first electrically insulating molded assembly configured to cover the first power conductor, and further comprising a second electrically insulating molded assembly configured to cover the second power conductor, wherein the first and second electrically insulating molded assemblies are in contact with one another.

7. A system for isolating power conductors comprising:
a bus support;
first and second power conductors disposed proximal to one another along the bus support, wherein the bus support directly supports the first and second power conductors; and
an electrically insulating molded assembly having at least one contour configured to cover at least one of the first and second power conductors,
wherein the at least one of the first and second power conductors that is covered by the electrically insulating molded assembly is electrically insulated by the bus support on one side and by the electrically insulating molded assembly on an opposing side,
wherein the electrically insulating molded assembly includes an opening in the at least one contour configured to allow passage to the at least one of the first and second power conductors, and
further comprising an electrically insulating molded boot attached to the electrically insulating molded assembly over the opening.

8. The system of claim 7, wherein the contour provides a substantially flat area disposed directly over the at least one of the first and second power conductors.

9. The system of claim 8, wherein the contour is followed by a curved area disposed over an edge of the at least one of the first and second power conductors.

10. The system of claim 7, wherein the opening is located in at least one of a left side and a right side of the electrically insulating molded assembly.

11. The system of claim 7, wherein the electrically insulating molded assembly is a single injection molded part.

12. The system of claim 7, wherein the electrically insulating molded assembly is a first electrically insulating molded assembly configured to cover the first power conductor, and further comprising a second electrically insulating molded assembly configured to cover the second power conductor, wherein the first and second electrically insulating molded assemblies are in contact with one another.

13. A system for isolating power conductors comprising:
a bus support;
first and second power conductors disposed proximal to one another along the bus support, wherein the bus support directly supports the first and second power conductors; and
an electrically insulating molded assembly having at least one contour configured to cover at least one of the first and second power conductors,
wherein the at least one of the first and second power conductors that is covered by the electrically insulating molded assembly is electrically insulated by the bus support on one side and by the electrically insulating molded assembly on an opposing side,
wherein the electrically insulating molded assembly is a first electrically insulating molded assembly configured to cover the first power conductor, and further comprising a second electrically insulating molded assembly configured to cover the second power conductor, wherein the first and second electrically insulating molded assemblies are in contact with one another.

14. The system of claim 13, wherein the contour provides a substantially flat area disposed directly over the at least one of the first and second power conductors.

15. The system of claim 14, wherein the contour is followed by a curved area disposed over an edge of the at least one of the first and second power conductors.

16. The system of claim 13, wherein the electrically insulating molded assembly includes an opening in the at least one contour configured to allow passage to the at least one of the first and second power conductors.

17. The system of claim 16, wherein the opening is located in at least one of a left side and a right side of the electrically insulating molded assembly.

18. The system of claim 16, further comprising an electrically insulating molded boot attached to the electrically insulating molded assembly over the opening.

19. The system of claim 13, wherein the electrically insulating molded assembly is a single injection molded part.

* * * * *